(12) United States Patent
Xu et al.

(10) Patent No.: US 10,708,840 B2
(45) Date of Patent: Jul. 7, 2020

(54) CIRCUIT SWITCHED FALLBACK METHOD AND DEVICE

(71) Applicant: Samsung Electronics Co., Ltd., Gyeonggi-do (KR)

(72) Inventors: Lixiang Xu, Beijing (CN); Xiaowan Ke, Beijing (CN); Hong Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/091,417

(22) PCT Filed: Apr. 6, 2017

(86) PCT No.: PCT/KR2017/003777
§ 371 (c)(1),
(2) Date: Oct. 4, 2018

(87) PCT Pub. No.: WO2017/176071
PCT Pub. Date: Oct. 12, 2017

(65) Prior Publication Data
US 2019/0159099 A1    May 23, 2019

(30) Foreign Application Priority Data

Apr. 8, 2016 (CN) .......................... 2016 1 0216804
Apr. 12, 2016 (CN) .......................... 2016 1 0225078

(51) Int. Cl.
*H04W 36/30* (2009.01)
*H04W 36/00* (2009.01)
(Continued)

(52) U.S. Cl.
CPC ..... *H04W 36/305* (2018.08); *H04W 36/0022* (2013.01); *H04W 36/0066* (2013.01);
(Continued)

(58) Field of Classification Search
CPC . H04W 36/0022; H04W 36/08; H04W 36/14; H04W 36/0005; H04W 76/18;
(Continued)

(56) References Cited

U.S. PATENT DOCUMENTS 8,428,035 B2 * 4/2013 Nishida ................. H04W 36/14
370/335
2011/0216645 A1 9/2011 Song et al.
(Continued)

OTHER PUBLICATIONS

PCT/ISA/210 Search Report issued on PCT/KR2017/003777 (pp. 3).
(Continued)

*Primary Examiner* — Nam T Huynh
(74) *Attorney, Agent, or Firm* — The Farrell Law Firm, P.C.

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). According to an embodiment of the present disclosure, a circuit switched fallback (CSFB) method is provided. The method comprising: receiving, by a first base station, a user equipment (UE) context modification request message from a mobility management entity (MME), wherein the UE context modification request message includes a CSFB indicator; receiving, by the first base station, a radio link failure (RLF) indication message from a second base station; and determining, by the first base station, whether to trigger a handover procedure.

16 Claims, 7 Drawing Sheets

(51) Int. Cl.
  *H04W 76/19* (2018.01)
  *H04W 36/08* (2009.01)
  *H04W 76/20* (2018.01)
(52) U.S. Cl.
  CPC ........... *H04W 36/08* (2013.01); *H04W 76/19* (2018.02); *H04W 76/20* (2018.02)
(58) Field of Classification Search
  CPC ............ H04W 36/0079; H04W 76/19; H04W 36/305; H04W 36/0066; H04W 76/20; H04W 36/36; H04W 36/0011
  See application file for complete search history.

(56) References Cited

U.S. PATENT DOCUMENTS

| | | |
|---|---|---|
| 2014/0179318 A1 | 6/2014 | Wang |
| 2014/0334371 A1* | 11/2014 | Kim .................. H04W 52/0206 370/311 |
| 2015/0237544 A1 | 8/2015 | Jeong et al. |
| 2016/0057802 A1 | 2/2016 | Lee et al. |
| 2016/0100336 A1 | 4/2016 | Basavarajappa et al. |

OTHER PUBLICATIONS

PCT/ISA/237 Written Opinion issued on PCT/KR2017/003777 (pp. 5).
Samsung, "Increased CSFB Setup Delay Problem in Case of Context Fetch", R3-160676, 3GPP TSG-RAN WG3 Meeting #91bis, Apr. 11-15, 2016, 2 pages.
Huawei, "Context Fetch", R3-141628, 3GPP TSG-RAN3 Meeting #85, Aug. 18-22, 2014, 4 pages.
Samsung, "Introduction of Solution to Solve CSFB Setup Delay Problem", R3-160678, 3GPP TSG-RAN WG3 Meeting #91bis, Apr. 11-15, 2016, 15 pages.
Samsung, China Telecom, "Increased CSFB Setup Delay Problem in Case of Context Fetch", R3-162138, 3GPP TSG-RAN WG3 Meeting #93bis, Oct. 10-14, 2016, 4 pages.
3rd Generation Partnership Project; Technical Specification Group Radio Access Network; Evolved Universal Terrestrial Radio Access Network (E-UTRAN); S1 Application Protocol (S1AP) (Release 13), 3GPP TS 36.413 V13.2.0, Mar. 2016, 321 Pages.
European Search Report dated Nov. 29, 2018 issued in counterpart application No. 17779371.8-1214, 13 pages.

* cited by examiner

[Fig. 1]
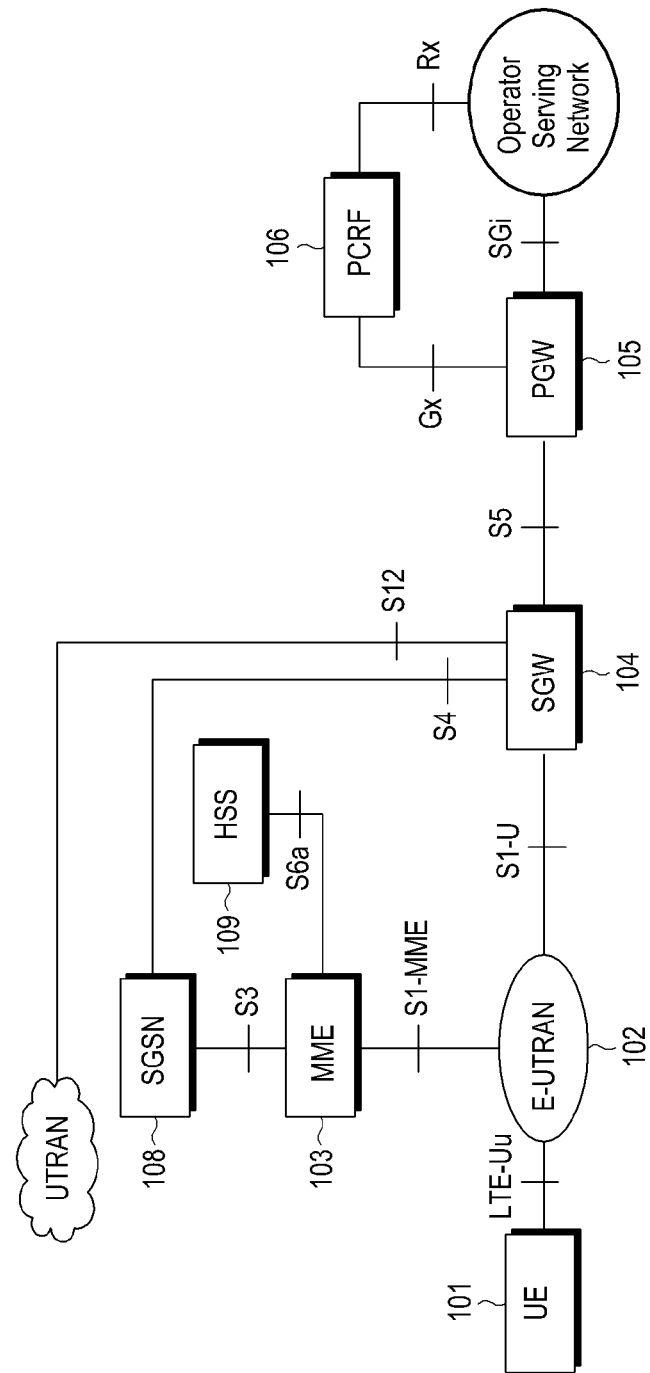

[Fig. 2]
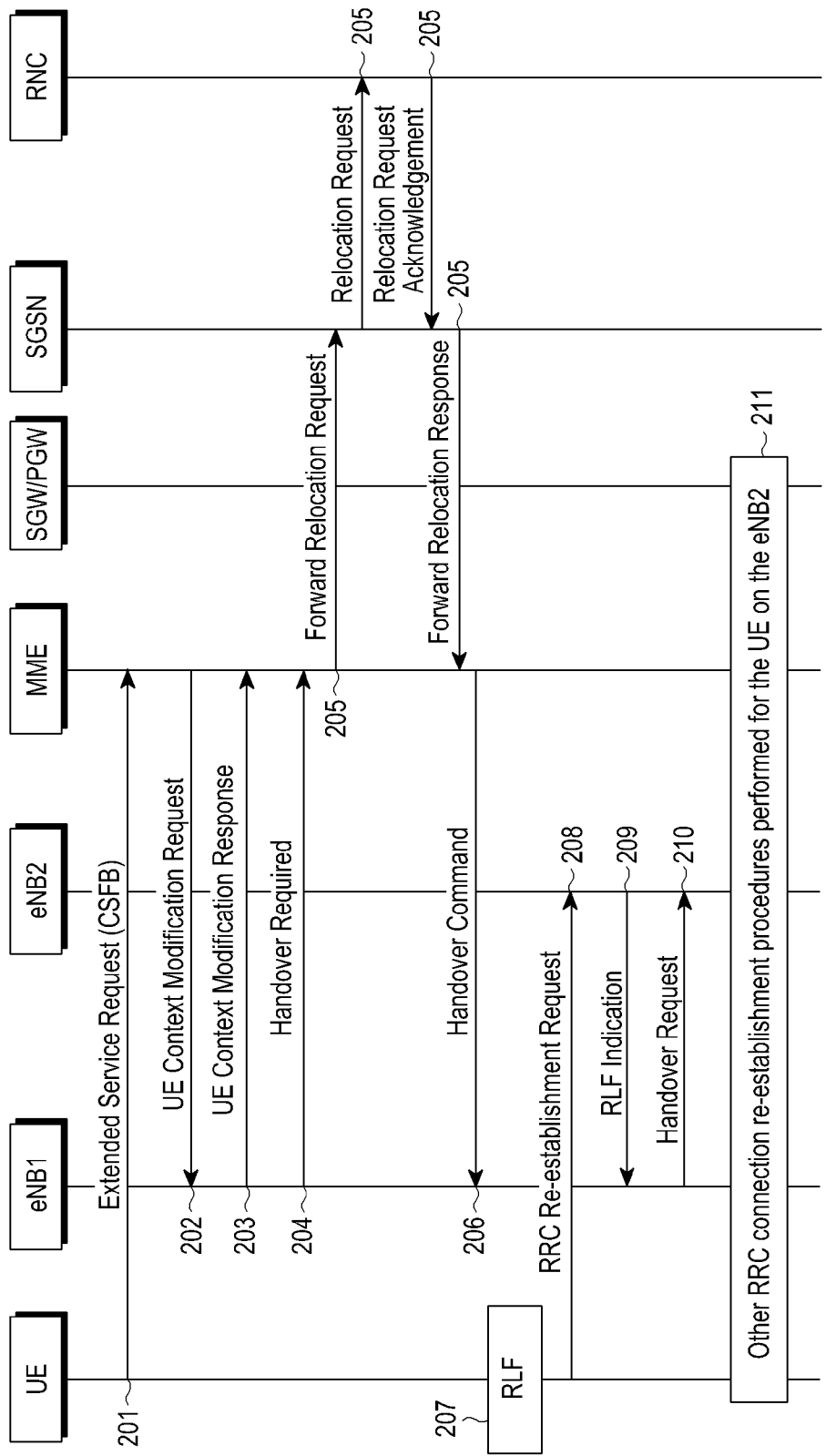

[Fig. 3]
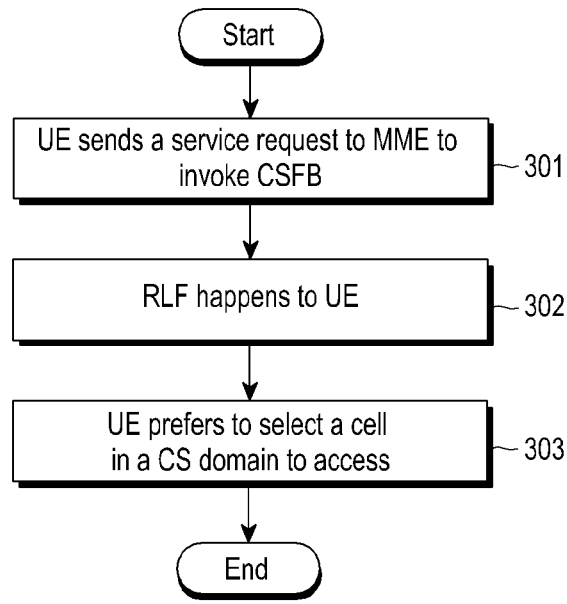
[Fig. 4]
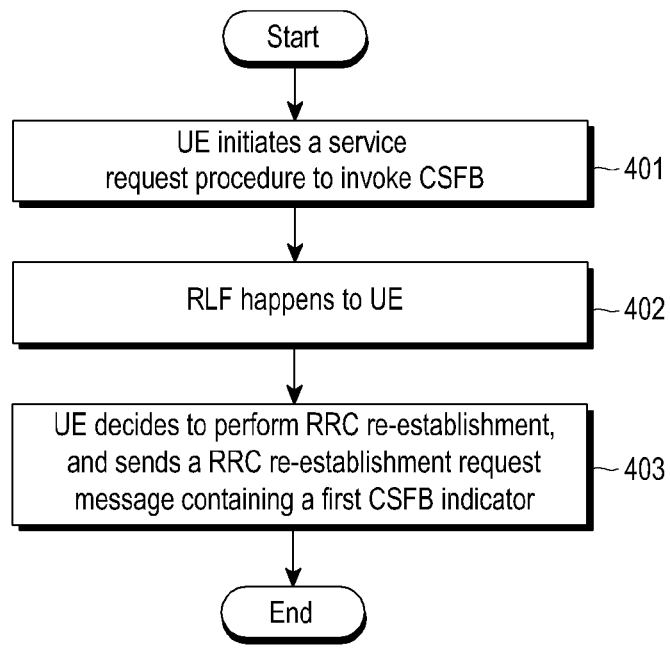

[Fig. 5]
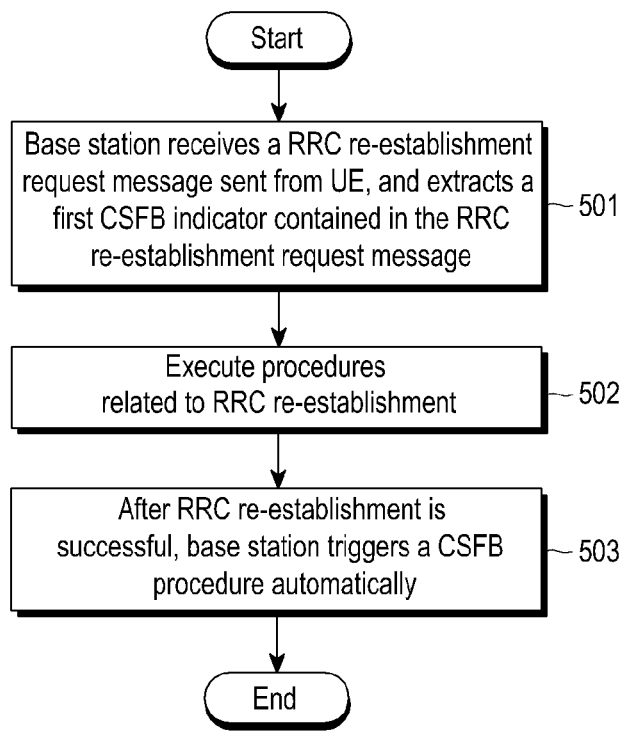

[Fig. 6]
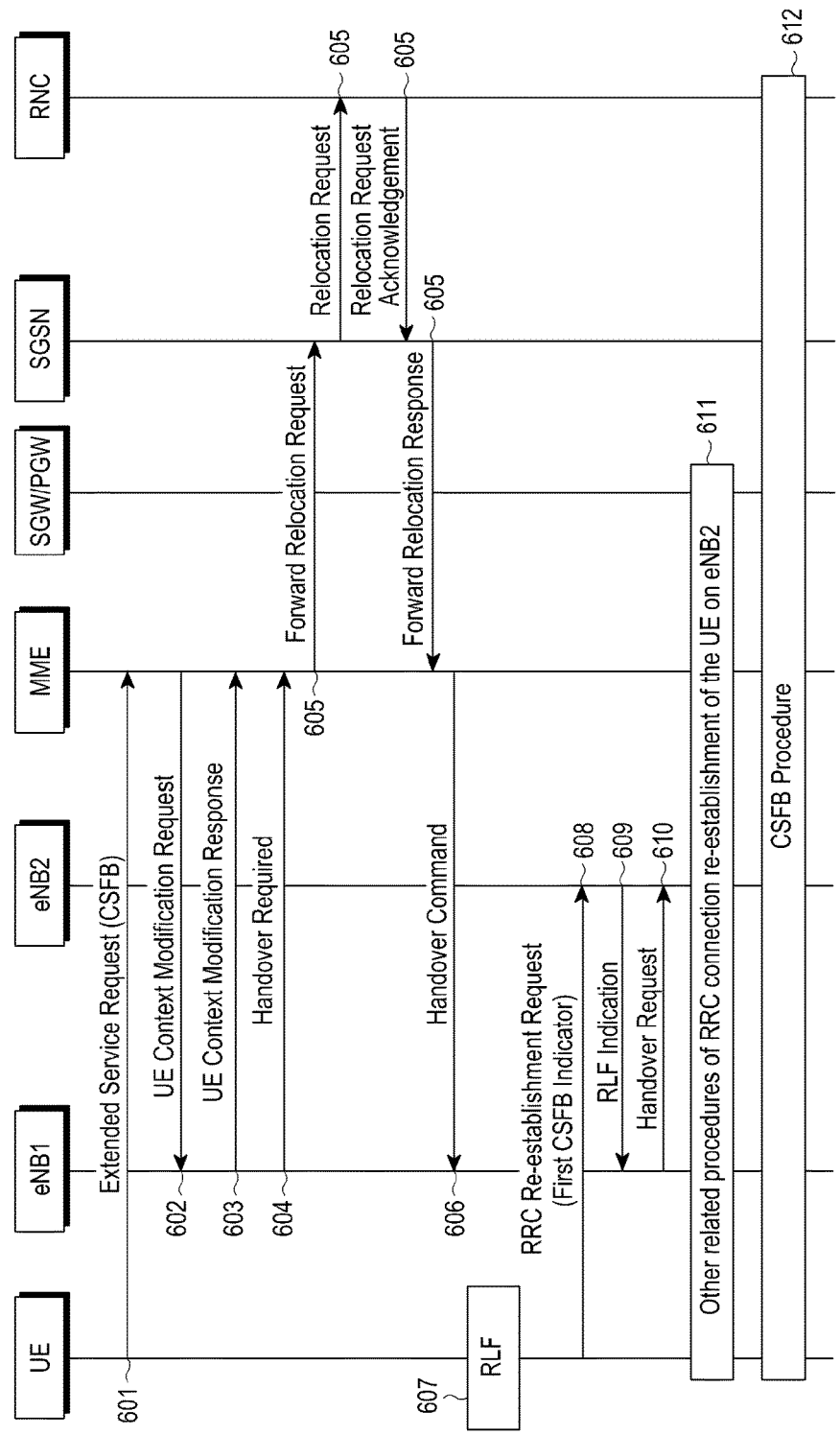
[Fig. 7]
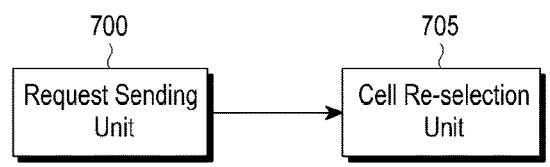

[Fig. 8]
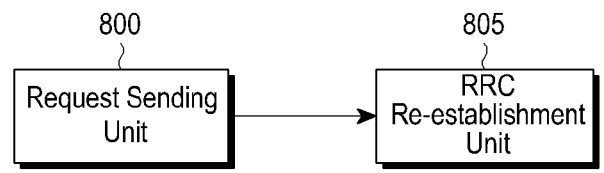
[Fig. 9]
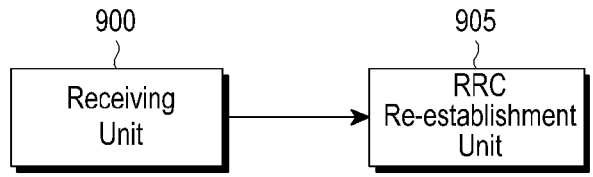
[Fig. 10]
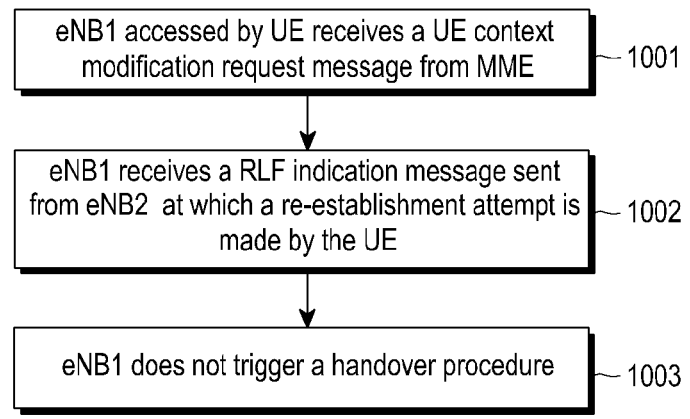

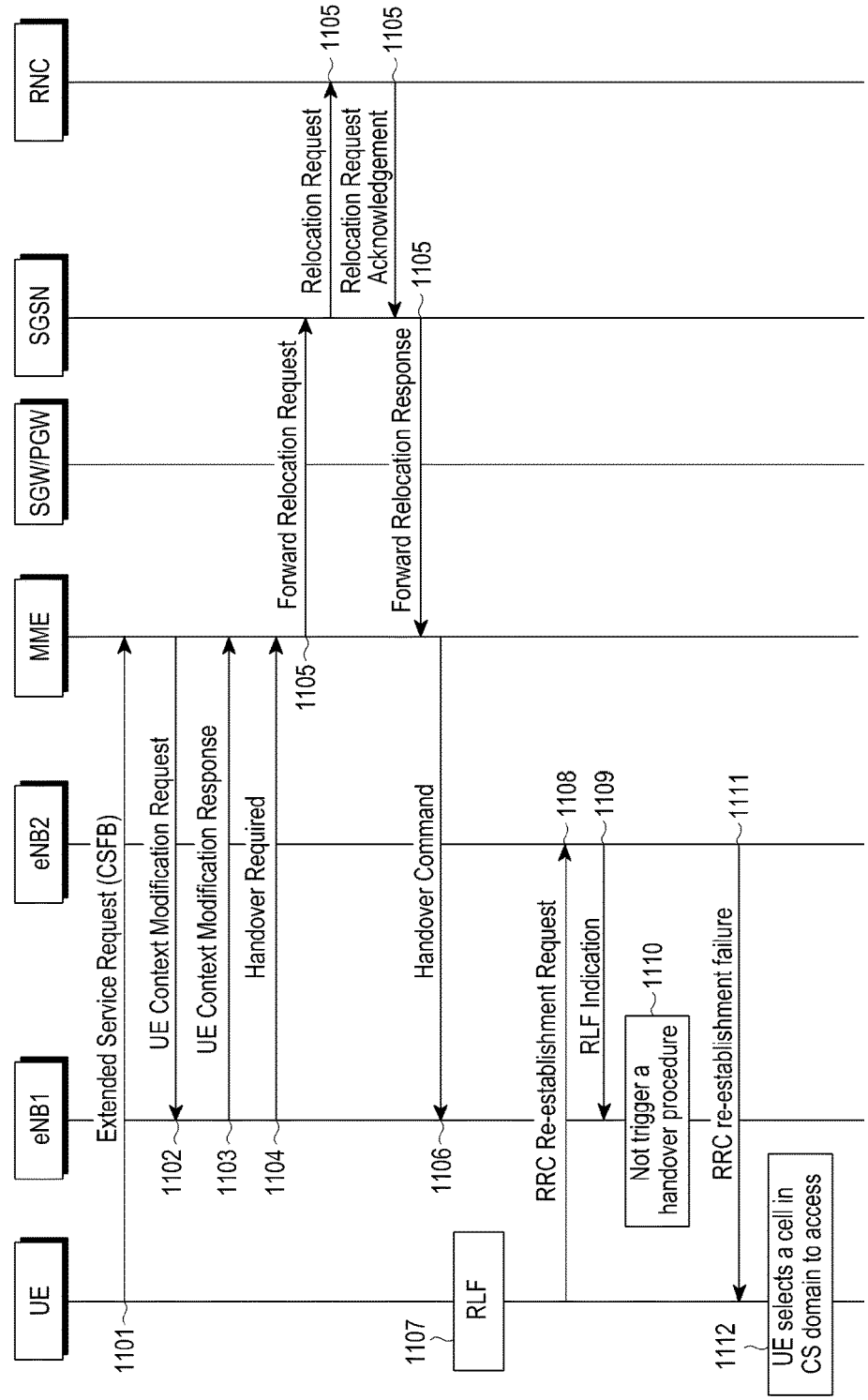
[Fig. 11]
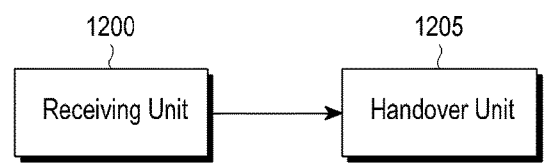
[Fig. 12]

CIRCUIT SWITCHED FALLBACK METHOD AND DEVICE

PRIORITY

This application is a National Phase Entry of International Application No. PCT/KR2017/003777, which was filed on Apr. 6, 2017, and claims priority to Chinese Patent Application Nos. 201610216804.4 and 201610225078.2, which were filed on Apr. 8, 2016 and Apr. 12, 2016, the contents of each of which are incorporated herein by reference.

TECHNICAL FIELD

The present disclosure relates to a method and device for voice communications in the communication system, and in particular, to a method and device for a circuit switched fallback method and device.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Modern mobile communication technologies more and more tend to provide users with multi-media services at high transmission rates.

FIG. 1 shows a diagram of a system architecture evolution (SAE) system architecture.

In FIG. 1, a user equipment (UE) 101 is a terminal device for receiving data. An evolved universal terrestrial radio access network (E-UTRAN) 102 is a radio access network which includes a macro base station (eNodeB/NodeB) that provides an interface for the UE 101 to access a radio network. A mobility management entity (MME) 103 is responsible for managing a mobility context, a session context and security information of the UE 101. A serving gateway (SGW) 104 is responsible for providing user plane functions. The MME 103 and the SGW 104 may be located in a same physical entity. A packet data network gateway (PGW) 105 is responsible for functions such as charging and lawful interception, and PGW 105 may be located in a same physical entity with the SGW 104. A policy and charging rules function (PCRF) entity 106 is responsible for providing quality of service (QoS) policies and charging rules. A serving general packet radio service (GPRS) support node (SGSN) 108 is a network node device that provides routing for data transmissions in a universal mobile telecommunications system (UMTS). A home subscriber server (HSS) 109 is a home subscriber subsystem of the UE 101, and HSS 109 is responsible for protecting user information such as a current location of the UE 101, an address of a serving node, user security information, and a packet data context of the UE 101.

DISCLOSURE OF INVENTION

Solution to Problem

The present disclosure provides a CSFB method and device which can reduce a latency of CS domain access in case of a RLF.

To achieve the foregoing object, the present disclosure provides the following technical solutions:

A method for circuit switched fallback (CSFB) procedure, comprising: receiving, by a first base station, a user equipment (UE) context modification request message from a mobility management entity (MME), wherein the UE context modification request message includes a CSFB indicator; receiving, by the first base station, a radio link failure (RLF) indication message from a second base station; and determining, by the first base station, whether to trigger a handover procedure.

A first base station for a circuit switched fallback (CSFB) procedure, comprising: a transceiver, configured to: receive a user equipment (UE) context modification request message from a mobility management entity (MME), wherein the UE context modification request message includes a CSFB indicator; and receive a radio link failure (RLF) indication message from a second base station, and a controller, configured to determine whether to trigger a handover procedure.

A circuit switched fallback (CSFB) method, comprising: sending, by a user equipment (UE), a service request message which is to invoke CSFB to a mobility management entity (MME); performing cell re-selection directly, by the UE, after a radio link failure (RLF) happens to the UE; in which when the UE performs the cell re-selection, the UE prefers a cell in a circuit switched (CS) domain.

Preferably, after the UE sends the service request message, a non-access stratum (NAS) of the UE notifies information about sending the service request message to an access stratum (AS) of the UE, and the AS saves the information; and when the UE performs the cell re-selection, the UE determines to prefer the cell in the CS domain to access according to the information saved by the AS.

Preferably, the cell in the CS domain is a universal terrestrial radio access network (UTRAN) cell or a global system for mobile communications (GSM) enhanced data rates for GSM evolution (EDGE) radio access network (GERAN) cell.

A circuit switched fallback (CSFB) method, comprising: sending, by a user equipment (UE), a service request message which is to invoke CSFB to a mobility management entity (MME); and performing, by the UE, radio resource control (RRC) re-establishment by sending a RRC re-establishment request message to a base station of a re-selected cell, after a radio link failure (RLF) happens to the UE, in which the RRC re-establishment request message includes a first CSFB indicator, and the first CSFB indicator is used to indicate the CSFB is required, to the base station.

Preferably, after the UE sends the service request message, a non-access stratum (NAS) of the UE notifies information about the UE sending the service request message, to an access stratum (AS) of the UE, and the AS saves the information; and when the UE sends the RRC re-establishment request message, the UE determines to include the first CSFB indicator in the RRC re-establishment request message, according to the information saved by the AS.

Preferably, the first CSFB indicator is further used to indicate whether a CSFB procedure has a high priority.

Preferably, when the first CSFB indicator is used to indicate that the CSFB procedure has the high priority, the RRC re-establishment request message includes a second CSFB indicator; in which the second CSFB indicator is to indicate whether an information element (IE) in a handover restriction list is used for the CSFB procedure having the high priority.

A circuit switched fallback (CSFB) method, comprising: receiving, by a base station, a radio resource control (RRC) re-establishment request message sent from a user equipment (UE); extracting by a base station, a first CSFB indicator which is used to indicate the CSFB is required to the base station, from the RRC re-establishment request message; and performing, by the base station, related procedures of RRC re-establishment, and after the RRC re-establishment is successful, triggering a CSFB procedure of the UE according to the first CSFB indicator.

Preferably, the base station further determines whether the CSFB procedure has a high priority according to the first CSFB indicator, and determines whether to use roaming or access restriction for the UE according to the first CSFB indicator.

Preferably, when the base station determines that the CSFB procedure has the high priority according to the first CSFB indicator received, the base station determines whether to use roaming or access restriction for the UE according to a second CSFB indicator included by the RRC re-establishment request message; in which the second CSFB indicator is to indicate whether an information element (IE) in a handover restriction list is used for the CSFB procedure having the high priority.

A user equipment (UE), comprising: a request sending unit, configured to send a service request message which is to invoke circuit switched fallback (CSFB) to a mobility management entity (MME); and a cell re-selection unit, configured to perform cell re-selection directly, after a radio link failure (RLF) happens, in which when the cell re-selection is performed, a cell in a circuit switched (CS) domain is preferred.

A user equipment (UE), comprising: a request sending unit, configured to send a service request message which is to invoke circuit switched fallback (CSFB) to a mobility management entity (MME); and a radio resource control (RRC) re-establishment unit, configured to perform RRC re-establishment by sending a RRC re-establishment request message to a base station of a re-selected cell, after a radio link failure (RLF) happens to the UE, in which the RRC re-establishment request message includes a first CSFB indicator, and the first CSFB indicator is used to indicate the CSFB is required, to the base station.

A base station, comprising: a receiving unit, configured to receive a radio resource control (RRC) re-establishment request message sent from a user equipment (UE), and extract a first circuit switched fallback (CSFB) indicator which is used to indicate CSFB is required to the base station, from the RRC re-establishment request message; and a RRC re-establishment unit, configured to perform related procedures of RRC re-establishment, and after the RRC re-establishment is successful, trigger a CSFB procedure of the UE according to the first CSFB indicator.

Advantageous Effects of Invention

As is seen from the foregoing technical solution, according to an embodiment of the present disclosure, a first base station accessed by a UE may receive a UE context modification request message sent from a MME, the UE context modification request message includes a CSFB indicator; the first base station receives a RLF indication message sent from a second base station where a re-selected cell of the UE is located, without triggering a procedure of switching the UE to the second base station, so as to enable RRC re-establishment between the UE and the second base station to be failure. In this way, UE waiting for a NAS timer after RRC re-establishment is successful can be avoided, RRC re-establishment is directly enabled to be failure and a cell in a CS domain is accessed, so as to reduce a latency of CS domain access.

According to another embodiment of the present disclosure, a UE may send a service request message for CSFB; and performs RRC re-establishment after a RLF happens to send a RRC re-establishment request message to a base station where a re-selected cell is located, and the RRC re-establishment request message includes a first CSFB indicator to indicate CS fallback is required to the base station. In this way, UE waiting for NAS timer after RRC re-establishment is avoided, and the base station triggers a CSFB procedure directly, so as to reduce a latency of CS domain access.

According to other embodiment of the present disclosure, a UE sends a service request message which is to invoke CSFB; and the UE performs cell re-selection after a radio link failure (RLF) happens to the UE, and prefers a cell in a CS domain to perform access. In this way, a latency of CS domain access can be reduced in case of a RLF.

BRIEF DESCRIPTION OF DRAWINGS

FIG. 1 is a schematic diagram of a SAE system architecture;

FIG. 2 is a schematic diagram of a flow in case of a RLF happening during traditional CSFB of the present disclosure;

FIG. 3 is a schematic diagram of an example flow of a first CSFB method according to various embodiments of the present disclosure;

FIG. 4 is a schematic diagram of an example flow of a second CSFB method at a UE, according to various embodiments of the present disclosure;

FIG. 5 is another schematic diagram of an example flow of the second CSFB method at a base station, according to various embodiments of the present disclosure;

FIG. 6 is a schematic diagram of an example flow of the second CSFB method between multiple entities, according to an embodiment of the present disclosure;

FIG. 7 is a schematic diagram of an example of a basic structure of a UE corresponding to the first CSFB method according to an embodiment of the present disclosure;

FIG. 8 is a schematic diagram of an example of a basic structure of a UE corresponding to the second CSFB method according to an embodiment of the present disclosure;

FIG. 9 is a schematic diagram of an example of a basic structure of a base station corresponding to the second CSFB method according to an embodiment of the present disclosure;

FIG. 10 is a schematic diagram of an example flow of a third CSFB method at a base station, according to various embodiments of the present disclosure;

FIG. 11 is a schematic diagram of an an example flow of the third CSFB method between multiple entities, according to an embodiment of the present disclosure; and FIG. 12 is a schematic diagram of an example of a basic structure of a base station corresponding to the third CSFB method according to an embodiment of the present disclosure.

MODE FOR THE INVENTION

FIGS. 2 through 12, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

A way to provide voice services in the LTE system is through circuit switched fallback (CSFB), i.e., switching or redirecting the UE to a 3G or 2G network to use circuit switched (CS) domain services.

When CSFB is used, during a CS service accessing procedure, a radio link failure (RLF) may happen to the UE, and according to a traditional processing method, when the RLF happens, the RLF may cause the CS service to have a large latency. This issue will be illustrated by an example shown in FIG. 2.

FIG. 2 is a schematic diagram of a flow in case of a RLF happening during traditional CSFB of the present disclosure.

In step 201, a UE sends an extended service request message to a MME.

The extended service request message may be a message for requesting of CSFB.

In step 202, the MME sends a UE context modification request message to a base station 1 (eNB1).

The UE context modification request message may include a CSFB indicator.

In step 203, the eNB1 sends a UE context modification response message to the MME.

In step 204, the eNB1 initiates a handover procedure to switch the UE to a radio network controller (RNC). The eNB1 sends a handover required message to the MME.

In step 205, the MME sends a forward relocation request message to a SGSN. The SGSN sends a relocation request message to the RNC. The RNC sends a relocation request acknowledgement message to the SGSN. The SGSN sends a forward relocation response message to the MME.

In step 206, the MME sends a handover command message to the eNB1.

In step 207, a radio link failure happens to the UE.

The radio link failure may happen at any time after step 201 and before step 206.

In step 208, the UE performs cell re-selection and selects a cell controlled by an eNB2. The UE sends a radio resource control (RRC) re-establishment request message to the eNB2.

In step 209, the eNB2 sends a RLF indication message to the eNB1.

In step 210, the eNB1 sends a handover request message to the eNB2.

In step 211, other RRC connection re-establishment procedures are performed for the UE on the eNB2.

Detailed processing in the step 211 may include at least one of the following. The eNB2 sends a RRC re-establishment message to the UE, the UE sends a RRC re-establishment completion message to the eNB2, the eNB2 sends a RRC re-configuration message to the UE, the eNB2 sends a path handover request message to the MME, the MME performs a bearer modification request procedure between the MME and the SGW/PGW, the MME sends a path handover request acknowledgement message to the eNB2, and the eNB2 sends a UE context release message to the eNB1.

After processing the step 211, the UE accesses the eNB2 successfully. But the eNB2 does not know the CSFB request of the UE, and the UE needs to wait to attempt to execute CSFB until a timer of a non-access stratum (NAS) of the UE expires. This costs the UE a relatively long time to successfully request the CS service, which reduces user experience and a degree of satisfactory.

In case of a RRC re-establishment failure, the UE will readily turn to a legacy radio access technique. When a RLF happens to a base station that supports context fetch, generally a RRC re-establishment procedure will be successful; when a RLF happens to a base station that does not support context fetch, a RRC re-establishment procedure will be failure. Therefore, if a RLF happens to the base station that supports context fetch, there will be a larger latency of CSFB establishment than that in a situation where a RLF happens to the base station that does not support context fetch.

First, the reason that a relatively large latency is caused in circuit switched fallback (CSFB) will be analyzed. During a communication procedure, after a radio link failure (RLF), a user equipment (UE) will first determine that radio resource control (RRC) re-establishment is required, and before RRC re-establishment is failure or after RRC re-establishment is successful, a RRC layer of the UE will not determine a failure of a lower layer. However, during RRC re-establishment, the UE performs cell re-selection according to a signal strength, a channel condition, etc., and there is no special restriction for the type of a re-selected cell. In this case, a re-selected cell during RRC re-establishment may still be a cell of a LTE system (assuming that the re-selected cell is a cell controlled by eNB2), and then, if RRC re-establishment is successful, since the eNB2 does not know the UE has requested CSFB, therefore, the UE needs to wait until a non-access stratum (NAS) timer of the UE expires to trigger a CSFB procedure, which causes the latency of CSFB establishment to be large.

Based on the foregoing analysis, in a first CSFB method according to the present disclosure, after a RLF happens, the UE restricts the type of a re-selected cell, and prefers a cell in a CS domain as the re-selected cell, so that the UE can directly fall back to the circuit switched (CS) domain.

FIG. 3 is a schematic diagram of an example flow of a first CSFB method according to various embodiments of the present disclosure. As shown in FIG. 3, the method may comprise the following steps:

In step 301, a UE sends a service request message to a mobility management entity (MME) to invoke CSFB.

The UE initiates a service request for CSFB towards the MME. Preferably a non-access stratum (NAS) of the UE notifies this information to an access stratum (AS) of the UE.

That is, the UE initiates the service request message for CSFB, and the AS of the UE may save this information.

In step 302, a RLF happens to the UE.

In step 303, the UE performs cell re-selection, and the UE prefers a cell in a CS domain.

To make the UE directly fall back to the CS domain, when the UE performs cell re-selection, if the UE determines that the UE has sent a service request for invoking CSFB, but that the UE has not been successfully switched or redirected to the CS domain, the UE may directly select a cell that supports the CS domain, e.g., a universal terrestrial radio access network (UTRAN) cell or a global system for mobile communications (GSM) enhanced data rates for GSM evolution (EDGE) radio access network (GERAN) cell.

If the UE finds a suitable UTRAN or GERAN cell, then the UE can fall back to the CS domain, and then the UE may perform a suitable mobility management (MM) or call control (CC) procedure in the selected cell. An evolved packet system (EPS) mobility management (EMM) sub-layer may not instruct a MM sub-layer to terminate the service request procedure. In this way, without a RRC re-establishment procedure, the UE directly selects the cell in the CS domain to access, so as to directly fall back to the CS domain.

During processing of the step 303, preferably, the AS of the UE may decide to prefer the cell in the CS domain (e.g., a UTRAN or GERAN cell) to access according to information saved in the step 301. That is, when the UE performs cell re-selection, the AS of the UE prefers the cell in the CS domain to access according to information about the UE in the NAS having initiated the service request message for CSFB. When the UE falls back to the CS domain, information about an original base station may be emptied, including information notified to the AS by the NAS in the step 301.

As seen from the foregoing processing flow, according to the embodiment of the present disclosure, after the UE initiates the service request for CSFB, if the RLF happens, the UE directly decides the lower layer is failure, and prefers the cell in the CS domain to access, which avoids an unnecessary RRC re-establishment procedure, and thus shortens the latency of CSFB establishment. The method according to the embodiment of the present disclosure not only solves the issue that in case of RRC re-establishment being successful, the latency of CSFB establishment is large, but also compared to CSFB processing in case of RRC re-establishment being failure in traditional art, the first CSFB method according to the embodiment of the present disclosure also effectively reduces the latency of CSFB access. To be more specific, through information exchange between the NAS and the AS, the AS of the UE knows the event that the UE initiates the service request for CSFB, so that when the AS performs cell re-selection, the AS may restrict the type of the re-selected cell.

In the above first CSFB method, an unnecessary RRC re-establishment procedure can be skipped, so that when the UE performs cell re-selection, the UE directly falls back to the CS domain.

According to another embodiment of the present disclosure provides a second CSFB method, in which when a RLF happens, an existing cell re-selection procedure can not be affected, and a UE still can perform RRC re-establishment, but after RRC re-establishment is successful, an eNodeB re-selected by the UE is able to trigger a procedure of switching or redirecting the UE to a CS domain as soon as possible. The second CSFB method includes a processing method at the UE and a processing method at the base station which will be illustrated hereinafter.

FIG. 4 is a schematic diagram of an example flow of the second CSFB method provided according to an embodiment the present disclosure, specifically, processing method at the UE.

As shown in FIG. 4, the method may comprise the following:

Steps 401 to 402 are the same with steps 301 to 302, and will not be elaborated herein.

In step 403, the UE performs cell re-selection and decides to perform a RRC re-establishment procedure. The UE may send a RRC re-establishment request message which includes a first CSFB indicator.

For example, the UE may select a cell of an eNB2 during RRC re-establishment, and the UE may send the RRC re-establishment request message to the eNB2. The RRC re-establishment request message may include a first CSFB indicator to indicate that CS fallback is required.

Preferably, the AS layer of the UE may decide to include the first CSFB indicator in the RRC re-establishment request message according to information saved in the step 401 (i.e., information about the NAS of the UE having initiated the service request message for CSFB). Of course, the AS of the UE may decide in other ways, which is not limited herein.

For the first CSFB indicator, besides of indicating that CS domain fallback is required, to indicate call requests having different priorities in the CS domain, preferably, the first CSFB indicator may be further used to indicate whether a CSFB procedure has a high priority. To be specific, the UE may initiate CSFB procedures to carry out voice services of different levels, e.g., a normal call or an emergency call, and accordingly, the initiated CSFB procedures may have a normal priority or a high priority. When the first CSFB indicator includes information indicating that CSFB is required (CS fallback required), the CSFB procedure has the normal priority, and when the first CSFB indicator includes information indicating that CSFB has a high priority (CS fallback high priority), then the CSFB procedure has the high priority. When the CSFB procedure has the high priority, the voice service carried out also has a relatively high priority, e.g., an emergency call.

When an access cell is selected for the UE, if a UE context has an access restriction list for the UE, then according to a handover restriction list, some track areas (TAs) or radio access techniques (RATs) forbid access of the UE. The base station may determine whether to use roaming or access restriction for the UE according to the indication about whether the CSFB procedure having the high priority.

In the present disclosure, the normal priority can be referred to as the first priority, and the high priority can be referred to as the second priority, and as seen from the foregoing, the second priority is higher than the first priority.

Further, when the CSFB procedure has the high priority, preferably, in the RRC re-establishment request message sent by the UE, a second CSFB indicator may be included to indicate whether an information element (IE) in the handover restriction list is used for a CSFB call having the high priority. A base station which receives the RRC re-establishment request message, e.g., eNB2, may decide to use roaming or access restriction for the UE according to the first CSFB indicator and the second CSFB indicator received.

Generally, in a situation where a CSFB procedure has a high priority and there is not a second CSFB indicator, if there is handover restriction list information in the UE context, and a suitable cell cannot be found based on this information, then the eNB2 may not use roaming or access restriction for the UE, i.e., ignoring restriction by handover restriction list information. In a situation where a CSFB procedure has the high priority and there is a second CSFB indicator, if there is handover restriction list information in the UE context, the eNB2 may not use roaming or access restriction for the UE, i.e., ignoring restriction by handover restriction list information.

When RRC re-establishment is successful, the base station triggers a procedure of switching the UE to the CS domain or redirecting the UE to the CS domain (i.e., a CSFB procedure). Thus, the UE need not wait to try to execute CSFB until the NAS timer (T3417) expires, which can reduce the latency of CSFB establishment, and improve user experience and a degree of satisfactory. The CSFB procedure is the same with a traditional one, which will not be elaborated herein.

FIG. 5 is another schematic diagram of an example flow of the second CSFB method according to an embodiment of the present disclosure, Specifically, FIG. 5 is a processing method at a base station. As shown in FIG. 5, the method may comprise the following steps:

In step 501, the base station receives a RRC re-establishment request message sent from a UE, and extracts a first CSFB indicator included in the RRC re-establishment request message.

In the step 501, after the base station receives the RRC re-establishment request message, the base station may extract the first CSFB indicator and determine that CS fallback is required according to the first CSFB indicator.

Preferably, if the first CSFB indicator also includes an indication indicating that a CSFB procedure has a high priority, then the RRC re-establishment request message may further include a second CSFB indicator. After the base station extracts the first CSFB indicator and the second CSFB indicator, when there is handover restriction list information of the UE in the UE context, the base station may decide to use roaming or access restriction for the UE according to indication information extracted. After the base station determines that the UE is accessed, the RRC re-establishment procedure in step 502 is executed.

In step 502, the base station executes procedures related to RRC re-establishment.

The procedures related to RRC re-establishment are the same with those in traditional art, and will not be elaborated herein.

In step 503, after RRC re-establishment succeeds, the base station triggers a CSFB procedure automatically.

After RRC re-establishment succeeds, the base station may determine that CS fallback is required according to the first CSFB indicator in the step 501, and then trigger the CSFB procedure, i.e., triggering the procedure of switching the UE to the CS domain or triggering the procedure of redirecting the UE to the CS domain.

In the following, a detailed embodiment is provided to illustrate an implementation of the second CSFB method according to an embodiment of the present disclosure. To facilitate description, processing between multiple entities comprising both a UE and a base station will be described.

FIG. 6 is a schematic diagram of an example flow of the second CSFB method between multiple entities, according to an embodiment of the present disclosure.

As shown in FIG. 6, the embodiment may comprise the following steps:

In step 601, the UE may send an extended service request message to a MME. The purpose of the extended service request may be for CSFB.

In step 602, the MME may send a UE context modification request message to the base station 1 (eNB1). The UE context modification request message may include a CSFB indicator.

In step 603, the base station 1 (eNB1) may send a UE context modification response message to the MME.

In step 604, the base station 1 (eNB1) may initiate a procedure of handover the UE to a radio network controller (RNC). The base station 1 (eNB1) may send a handover required message to the MME.

In step 605, the MME may send a forward relocation request message to a serving general packet radio service (GPRS) support node (SGSN). The SGSN may send a relocation request message to a radio network controller (RNC). The RNC may send a relocation request acknowledgement message to the SGSN. The SGSN may send a forward relocation response message to the MME.

In step 606, the MME may send a handover command message to the base station 1 (eNB1).

In step 607, a radio link failure (RLF) may happen to the UE. The radio link failure (RLF) may happen at any time after the step 601 and before the step 606.

In step 608, the UE may perform cell re-selection and select a cell controlled by the base station 2 (eNB2). The UE may send a RRC re-establishment request message to the base station 2 (eNB2). The RRC re-establishment request message may include a first CSFB indicator. Also, the RRC re-establishment request message may include a second CSFB indicator. The first CSFB indicator and the second CSFB indicator can be the same with those in the step 403 of FIG. 4, and will not be elaborated herein.

In step 609, the base station 2 (eNB2) may send a RLF indication message to the base station 1 (eNB1).

In step 610, the base station 1 (eNB1) may send a handover request message to the base station 2 (eNB2).

In step 611, other procedures of RRC connection re-establishment of the UE on the base station 2 (eNB2) are executed. To be specific, the base station 2 (eNB2) may send a RRC re-establishment message to the UE, the UE may send a RRC re-establishment completion message to the base station 2 (eNB2), the base station 2 (eNB2) may send a RRC re-configuration message to the UE, the base station 2 (eNB2) may send a path handover request message to the MME, the MME may execute a bearer modification request procedure between the UE and a serving gateway (SGW)/packet data network gateway (PGW), the MME may send a path handover request acknowledgement message to the base station 2 (eNB2), and the base station 2 (eNB2) may send a UE context release message to the base station 1 (eNB1).

After these procedures, the UE can access the base station 2 (eNB2) successfully.

In step 612, the base station 2 (eNB2) may know that the UE has requested the service request for CSFB according to the first CSFB indicator received from the UE in step 608. The base station 2 (eNB2) may trigger a CSFB procedure of the UE. The CSFB procedure may be a procedure of switching the base station 2 (eNB2) to the RNC or a RRC redirection procedure. The CSFB procedure is the same with that in traditional art and will not be elaborated herein.

The present disclosure further provides examples of the embodiments of a UE and a base station for CSFB to implement processing of FIG. 3 to FIG. 5.

FIG. 7 is a schematic diagram of an example of a basic structure of a UE corresponding to the first CSFB method according to an embodiment of the present disclosure.

Corresponding to the processing method in FIG. 3, an example of a basic structure of a UE provided according to an embodiment of the present disclosure is shown in FIG. 7, comprising: a request sending unit 700 and a cell re-selection unit 705. The request sending unit 700 may be used to send a service request message, and the service request message may be used to invoke circuit switched fallback (CSFB); the cell re-selection unit 705 may be used to perform cell re-selection after a RLF happens; in which when cell re-selection is performed, a cell in a CS domain is preferred to perform access.

According to an example embodiment of the present invention, the request sending unit 700 or the cell re-selection unit 705 may be implemented by a transceiver. And according to an example embodiment of the present invention, the request sending unit 700 or the cell re-selection unit 705 may be implemented or controlled by a controller.

FIG. 8 is a schematic diagram of an example of a basic structure of a UE corresponding to the second CSFB method according to an embodiment of the present disclosure.

Corresponding to the processing method in FIG. 4, an example of a basic structure of a UE provided according to an embodiment of the present disclosure is as shown in FIG. 8, comprising: a request sending unit 800 and a RRC re-establishment unit 805. The request sending unit 800 may be used to send a service request message, and the service request message may invoke circuit switched fallback (CSFB); the RRC re-establishment unit 805 may be used to perform RRC re-establishment after a RLF happens; when RRC re-establishment is performed, a RRC re-establishment request message sent to a base station which performs cell re-selection may include a first CSFB indicator, and the first CSFB indicator may indicate CS fallback is required to the base station.

According to an example embodiment of the present invention, the request sending unit 800 or the RRC re-establishment unit 805 may be implemented by a transceiver. And according to an example embodiment of the present invention, the request sending unit 800 or the RRC re-establishment unit 805 may be implemented or controlled by a controller.

FIG. 9 is a schematic diagram of an example of a basic structure of a base station corresponding to the second CSFB method according to an embodiment of the present disclosure.

Corresponding to the processing method of FIG. 5, an example of a basic structure of a base station provided according to an embodiment of the present disclosure is as shown in FIG. 9, comprising: a receiving unit 900 and a RRC re-establishment unit 905. The receiving unit 900 may be used to receive a RRC re-establishment request message sent from the UE, and may extract a first CSFB indicator from the RRC re-establishment request message, and the first CSFB indicator may be used to indicate CS fallback is required to the base station; and the RRC re-establishment unit 905 may be used to perform related procedures of RRC re-establishment, and trigger a CSFB procedure of the UE according to the first CSFB indicator after RRC re-establishment is successful.

According to an example embodiment of the present invention, the receiving unit 900 or the RRC re-establishment unit 905 may be implemented by a transceiver. And according to an example embodiment of the present invention, the receiving unit 900 or the RRC re-establishment unit 905 may be implemented or controlled by a controller.

Through the methods and devices of the present disclosure, when a RLF happens during CSFB processing, to avoid RRC re-establishment, a UE is enabled to directly access a cell in a CS domain, which reduces the latency of CSFB establishment; or when a RLF happens during CSFB processing, to avoid the UE waiting for a NAS timer after RRC re-establishment is successful, a CSFB procedure is triggered as soon as possible, which also reduces the latency of CSFB establishment.

In a third CSFB method provided according to an embodiment of the present disclosure, after a RLF happens, when an eNB1 accessed by a UE receives a RLF indication, if the eNB1 saves the CSFB indicator and CSFB has not been successful yet, then the eNB1 may not trigger a handover procedure. In this way, the eNB2 may not receive a handover request message, and the eNB2 may send a RRC re-establishment failure message to the UE.

In case of re-establishment being failure, the UE will prefer a cell in a CS domain to access, so that the UE need not wait for expiration of a NAS timer, which reduces the latency of CSFB access.

FIG. 10 is a schematic diagram of an example flow of a third CSFB method in which various embodiments of the present disclosure.

In FIG. 10, processing at a base station is may be implemented as an optimized example, and thus, only processing at the base station is involved when the flow is described. As shown in FIG. 10, the method may comprise the following steps:

In step 1001, a base station 1 (eNB1) accessed by a UE may receive a UE context modification request message from a MME.

After the MME receives an extended service request message sent from the UE, the MME may send the UE context modification request message to the base station 1 (eNB1). The purpose of the service request message may be for CSFB.

The UE context modification request message sent by the MME may include a CSFB indicator. The CSFB indicator can be the same with the first CSFB indicator in the step 403 of FIG. 4, and basically, the CSFB indicator is used to indicate that CS fallback is required; preferably, the first CSFB indicator may also be used to indicate whether a CSFB procedure has a high priority.

When the CSFB indicator is used to indicate that the CSFB procedure has the high priority, the UE context modification request message may also include a second CSFB indicator. The second CSFB indicator can be the same with that in the step 403 of FIG. 4 and will not be elaborated herein.

The base station 1 (eNB1) may save the received CSFB indicator, or the base station 1 (eNB1) may save the CSFB indicator and the second CSFB indicator received. The CSFB indicator and the second CSFB indicator saved by the base station 1 (eNB1) can be deleted after the UE completes CSFB.

In step 1002, the base station 1 (eNB1) may receive a RLF indication message sent from the base station 2 (eNB2) at which a re-establishment attempt is made by the UE.

After the step 1001, a RLF may happen, and in this case, the UE will perform cell re-selection and trigger RRC re-establishment procedure in the cell. Assuming that a base station where the cell re-establishment request is sent by the UE is controlled by eNB2, the eNB2 may send a RLF indication to the eNB1.

In step 1003, the eNB1 may not trigger a handover procedure.

In the step 1001, the MME may send the CSFB indicator to the eNB1. When the eNB1 determines that CS fallback is required, the eNB1 may also determine whether to trigger the handover procedure according to the saved CSFB indicator or according to the CSFB indicator and the second CSFB indicator saved. According to an embodiment of the present disclosure, the eNB1 may determine not to trigger the handover procedure based on the CSFB indicator or based on the CSFB indicator and the second CSFB indicator, so that RRC re-establishment between the UE and the eNB2 is failure.

If the eNB2 has not received a handover request message from the eNB1 in a certain period, the eNB2 may consider that requesting UE context is failure, and the eNB2 may send a RRC re-establishment failure message to the UE.

After RRC re-establishment is failure, the UE may determine that a lower layer failure happens, and when the UE determines that the UE has sent a service request to invoke CSFB and that the UE has not been handed over or has not been redirected to the CS domain successfully, the UE will prefer to select a cell that supports the CS domain, e.g., a UTRAN cell or a GERAN cell.

If the UE finds a suitable UTRAN or GREAN cell, the UE falls back to the CS domain, and the UE performs a suitable mobility management (MM) or call control (CC) procedure in the selected cell. The EMM sub-layer may not indicate the MM sub-layer to terminate the service request procedure. In this way, since RRC re-establishment is made failure directly and the UE selects a cell in the CS domain to access, the UE need not wait until RRC re-establishment is successful and the NAS timer (T3417) expires, which reduces the latency of CSFB access.

FIG. 11 is a schematic diagram of an an example flow of the third CSFB method between multiple entities, according to an embodiment of the present disclosure.

In the following, a detailed embodiment is provided to illustrate an implementation of the third CSFB method according to an embodiment of the present disclosure. To facilitate description, the third CSFB method will be described from an aspect of in-teractions between multiple entities. As shown in FIG. 11, the embodiment may comprise the following steps:

In step 1101, a UE sends an extended service request message to a MME.

The extended service request message may be for CSFB.

In step 1102, the MME may send a UE context modification request message to a base station 1 (eNB1).

The UE context modification request message may include a CSFB indicator, and may further include a second CSFB indicator. The base station 1 (eNB1) may save the CSFB indicator received, or may save the CSFB indicator and the second CSFB indicator received. The CSFB indicator and the second CSFB indicator can be the same with those in the step 1001 of FIG. 10, and will not be elaborated herein.

In step 1103, the base station 1 (eNB1) may send a UE context modification response message to the MME.

In step 1104, the base station 1 (eNB1) may initiate a procedure of handover the UE to a radio network controller (RNC). The base station 1 (eNB1) may send a handover required message to the MME.

In step 1105, the MME may send a forward relocation request message to a SGSN. The SGSN may send a relocation request message to the RNC. The RNC may send a relocation request acknowledgement message to the SGSN. The SGSN may send a forward relocation response message to the MME.

In step 1106, the MME may send a handover command message to the base station 1 (eNB1).

In step 1107, a radio link failure (RLF) may happen to the UE.

During processing of FIG. 11, the radio link failure (RLF) may happen at any time after the step 1102 and before the step 1106.

In step 1108, the UE may perform cell re-selection and select a cell controlled by the base station 2 (eNB2). The UE may send a RRC re-establishment request message to the base station 2 (eNB2).

In step 1109, the base station 2 (eNB2) may send a RLF indication message to the base station 1 (eNB1).

In step 1110, the base station 1 (eNB1) may not trigger a handover procedure.

At step 1102, the MME may send the CSFB indicator to the base station 1 (eNB1). The base station 1 (eNB1) may determine that CS fallback is required according to the CSFB indicator saved, or according to the CSFB indicator and the second CSFB indicator saved, and then the base station 1 (eNB1) may decide not to trigger the handover procedure so that RRC re-establishment between the UE and the base station 2 (eNB2) can be failure directly.

In step 1111, the base station 2 (eNB2) may have not received a handover request. The base station 2 (eNB2) may have not obtained UE context information, and the base station 2 (eNB2) may send a RRC re-establishment failure message to the UE. If the base station 2 (eNB2) has not received a handover request message from the base station 1 (eNB1) in a certain period, the base station 2 (eNB2) may consider that requesting the UE context is failure, and the base station 2 (eNB2) may send a RRC re-establishment failure message to the UE.

In step 1112, after RRC re-establishment is failure, the UE prefers to select a cell in the CS domain to access.

After RRC re-establishment is failure, the UE may determine that there is a lower layer failure, and when the UE determines that the UE has sent a service request for invoking CSFB and that the UE has not successfully switched or redirected to the CS domain, the UE will prefer to select a cell that supports the CS domain, e.g. a UTRAN cell or a GERAN cell.

If the UE finds the suitable UTRAN or GERAN cell, the UE falls back to the CS domain, and the UE may perform a suitable MM or CC procedure in the selected cell. The EMM sub-layer may not instruct the MM sub-layer to terminate the service request procedure. In this way, since RRC re-establishment is enabled to be failure directly and the UE selects a cell in the CS domain to access, it is unnecessary to wait until the RRC re-establishment procedure is successful and the NAS timer (T3417) expires, which reduces the latency of CSFB access.

According to the third CSFB method of the embodiment of the present disclosure, through processing at the network side, it can be the issue that there is some latency of CSFB establishment when a RLF happens to the UE on a base station that supports context fetch. But despite some latency through processing at the network side, the third CSFB method can shorten the latency of CSFB establishment since it is unnecessary to modify the UE, or to wait to try to execute CSFB until the NAS timer (T3417) after RRC re-establishment is successful.

FIG. 12 is a schematic diagram of an example of a basic structure of a base station corresponding to the third CSFB method according to an embodiment of the present disclosure.

Corresponding to the third CSFB method described in FIG. 10, a base station is provided according to an embodiment of the present disclosure, and an example of a basic structure of the base station is shown in FIG. 12, comprising a receiving unit 1200 and a handover unit 1205.

The receiving unit 1200 may be used to receive a UE context modification request message sent from a MME; and receive a RLF indication message sent from a base station 2 (eNB2) at which a re-establishment attempt is made by the UE, and notify the handover unit 1205 after receiving the RLF indication message. The UE context modification request message may include a CSFB indicator to indicate that CS fallback is required. The handover unit 1205 may be used to, after receiving a notification from the receiving unit 1200, not trigger a procedure of handover the UE to the base station 2 in order to make RRC re-establishment between the UE and the base station 2 be failure. Preferably, the UE context modification request message received by the receiving unit 1200 may further include a second CSFB indicator, and the receiving unit 1200 saves the received CSFB indicator, or saves the CSFB indicator and the second CSFB indicator received.

According to an example embodiment of the present invention, the receiving unit 1200 may be implemented by a transceiver, and the handover unit 1205 may be implemented or controlled by a controller.

It will be understood that all the operations of a base station or a UE as described above in the first to third embodiments are performed under the control of a control in the corresponding apparatus. However, it will be apparent that a controller and a transmitter or a controller and a receiver should not be necessarily implemented as separate units, but may be implemented as one constituent unit, for example, in the form of a single chip.

It should be noted that the apparatus configuration diagrams, the method illustration flowcharts, the conceptual views, and the like illustrated in FIGS. 2 to 12 are not intended to limit the scope of protection of the present disclosure. That is, it should not be construed that all the constituent units or operation steps shown in FIGS. 2 to 12 are essential elements for implementing the present disclosure, and it should be understood that the present disclosure can be implements by only some elements without departing from the basic scope of the present disclosure.

The above described operations may be implemented by providing a memory device storing corresponding program codes in any constituent unit of a base station or UE apparatus in a communication system. That is, a controller of the base station or UE apparatus may perform the above described operations by reading and executing the program codes stored in the memory device through a processor or a central processing unit (CPU).

The various units, elements, modules, and the like of the base station or UE apparatus as described herein may be operated using a hardware circuit, for example, a complementary metal oxide semiconductor based logical circuit, firmware, software, and/or a combination of hardware and firmware and/or software inserted into a machine-readable medium. As an example, various electric configurations and methods may be carried out using electrical circuits such as transistors, logic gates, and application specific integrated circuits (ASICs).

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

The invention claimed is:

1. A method performed by a first base station in a wireless communication system, the method comprising:
receiving, from a mobility management entity (MME), a user equipment (UE) context modification request message including a circuit switched fallback (CSFB) indicator;
receiving, from a second base station, a radio link failure (RLF) indication message; and
determining not to trigger a handover procedure based on the CSFB indicator and the RLF indication message.

2. The method of claim 1, wherein the first base station is located in a previous serving cell of the UE, and wherein the second base station is located in a re-selected cell of the UE.

3. The method of claim 1, wherein determining not to trigger the handover procedure causes RRC re-establishment between the UE and the second base station to fail.

4. The method of claim 1, wherein the CSFB indicator indicates priority information of a CSFB procedure.

5. The method of claim 4, wherein when the CSFB indicator indicates that the CSFB procedure has a high priority, the UE context modification request message further includes an additional CSFB indicator; and
wherein the additional CSFB indicator indicates whether an information element (IE) in a handover restriction list is used for the CSFB procedure having the high priority.

6. A first base station in a wireless communication system, comprising:
a transceiver configured to:
receive, from a mobility management entity (MME), a user equipment (UE) context modification request message including a circuit switched fallback (CSFB) indicator; and
receive, from a second base station, a radio link failure (RLF) indication message, and
a controller configured to determine not to trigger a handover procedure based on the CSFB indicator and the RLF indication message.

7. The first base station of claim 6, wherein determining not to trigger the handover procedure causes RRC re-establishment between the UE and the second base station to fail.

8. The first base station of claim 6, wherein the CSFB indicator indicates priority information of a CSFB procedure.

9. The first base station of claim 8, wherein when the CSFB indicator indicates that the CSFB procedure has a high priority, the UE context modification request message further includes an additional CSFB indicator; and
wherein the additional CSFB indicator indicates whether an information element (IE) in a handover restriction list is used for the CSFB procedure having the high priority.

10. The first base station of claim 6, wherein the first base station is located in a previous serving cell of the UE, and wherein the second base station is located in a re-selected cell of the UE.

11. A method performed by a first base station in a wireless communication system, the method comprising:
receiving, from a mobility management entity (MME), a user equipment (UE) context modification request message including a circuit switched fallback (CSFB) indicator;
receiving, from a second base station, a radio link failure (RLF) indication message; and
determining whether to trigger a handover procedure, wherein the CSFB indicator indicates that a CSFB procedure has a high priority, and the UE context modification request message further includes an additional CSFB indicator, and wherein the additional CSFB indicator indicates whether an information element (IE) in a handover restriction list is used for the CSFB procedure having the high priority.

12. The method of claim 11, wherein the first base station is located in a previous serving cell of the UE, and wherein the second base station is located in a re-selected cell of the UE.

13. The method of claim 11, wherein determining whether to trigger the handover procedure comprises determining not to trigger the handover procedure based on the CSFB indicator.

14. A first base station in a wireless communication system, comprising:
   a transceiver; and
   a processor configured to:
      receive, from a mobility management entity (MME) via the transceiver, a user equipment (UE) context modification request message including a circuit switched fallback (CSFB) indicator;
      receive, from a second base station via the transceiver, a radio link failure (RLF) indication message; and
      determine whether to trigger a handover procedure,
   wherein the CSFB indicator indicates a CSFB procedure has a high priority, and the UE context modification request message further includes an additional CSFB indicator, and
   wherein the additional CSFB indicator indicates whether an information element (IE) in a handover restriction list is used for the CSFB procedure having the high priority.

15. The first base station of claim 14, wherein the first base station is located in a previous serving cell of the UE, and wherein the second base station is located in a re-selected cell of the UE.

16. The first base station of claim 14, wherein the processor is configured to determine not to trigger the handover procedure based on the CSFB indicator.

\* \* \* \* \*